US006926106B2

(12) United States Patent
Richey, II et al.

(10) Patent No.: US 6,926,106 B2
(45) Date of Patent: Aug. 9, 2005

(54) WHEELCHAIR HAVING SPEED AND DIRECTION CONTROL TOUCHPAD

(75) Inventors: Joseph B. Richey, II, Chagrin Falls, OH (US); Bruce A. Jaenke, Parma, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 10/429,558

(22) Filed: May 5, 2003

(65) Prior Publication Data

US 2003/0192728 A1 Oct. 16, 2003

Related U.S. Application Data

(63) Continuation of application No. 09/416,647, filed on Oct. 12, 1999, now abandoned.

(51) Int. Cl.[7] .................................................. B60K 1/00
(52) U.S. Cl. .................. 180/65.1; 180/907; 297/DIG. 4
(58) Field of Search ....................... 280/250.1; 180/907, 180/65.1; 297/DIG. 4; 200/86 R, 46, 572, 512; 345/173; 178/18.01–18.05

(56) References Cited

U.S. PATENT DOCUMENTS

| | | | | | |
|---|---|---|---|---|---|
| 3,732,389 | A | * | 5/1973 | Kaelin et al. | 200/313 |
| 3,814,199 | A | * | 6/1974 | Jones | 180/6.5 |
| RE28,365 | E | * | 3/1975 | Braue | 200/86 R |
| 3,895,288 | A | | 7/1975 | Lampen et al. | |
| 3,911,215 | A | * | 10/1975 | Hurst et al. | 178/18.05 |
| 3,916,327 | A | | 10/1975 | Lamped et al. | |
| 3,968,467 | A | | 7/1976 | Lampen et al. | |
| 4,293,734 | A | * | 10/1981 | Pepper, Jr. | 178/18.01 |
| 4,323,829 | A | * | 4/1982 | Witney et al. | 318/55 |
| 4,444,998 | A | | 4/1984 | House | |
| 4,475,235 | A | * | 10/1984 | Graham | 382/121 |
| 4,493,219 | A | | 1/1985 | Sharp et al. | |
| 4,494,105 | A | | 1/1985 | House | |
| 4,523,769 | A | * | 6/1985 | Glaser et al. | 280/252 |
| 4,529,959 | A | * | 7/1985 | Ito et al. | 338/295 |
| 4,564,079 | A | * | 1/1986 | Moore et al. | 178/18.03 |
| 4,677,417 | A | | 6/1987 | Amagishi | |
| 4,707,570 | A | * | 11/1987 | Ide et al. | 178/18.05 |
| 4,983,786 | A | | 1/1991 | Stevens et al. | |
| 4,990,900 | A | * | 2/1991 | Kikuchi | 345/174 |
| 5,181,030 | A | | 1/1993 | Itaya et al. | |
| 5,199,520 | A | | 4/1993 | Chen | |
| 5,542,690 | A | * | 8/1996 | Kozicki | 280/304.1 |
| 5,550,339 | A | * | 8/1996 | Haugh | 200/5 A |
| 5,648,708 | A | | 7/1997 | Littlejohn | |
| 5,778,996 | A | * | 7/1998 | Prior et al. | 180/65.1 |
| 5,945,929 | A | * | 8/1999 | Westra | 341/34 |
| 6,104,317 | A | * | 8/2000 | Panagrossi | 341/20 |
| 6,215,478 | B1 | * | 4/2001 | Yeh et al. | 345/173 |
| 6,414,671 | B1 | * | 7/2002 | Gillespie et al. | 345/157 |
| 6,424,338 | B1 | * | 7/2002 | Anderson | 345/173 |
| 6,529,122 | B1 | * | 3/2003 | Magnussen et al. | 340/407.2 |

FOREIGN PATENT DOCUMENTS

| | | | | | |
|---|---|---|---|---|---|
| CA | 1017823 | | | 9/1977 | |
| EP | 135835 | A2 | * | 4/1985 | H01H/13/70 |
| EP | 235517 | A2 | * | 9/1987 | H01H/13/70 |
| GB | 1505272 | | | 3/1978 | |
| JP | 1230055 | | | 9/1989 | |
| JP | 03241623 | A | * | 10/1991 | H01H/13/52 |
| NL | 7908078 | | | 7/1981 | |

* cited by examiner

*Primary Examiner*—Christopher P. Ellis
*Assistant Examiner*—Kelly E Campbell
(74) *Attorney, Agent, or Firm*—Calfee, Halter & Griswold LLP

(57) ABSTRACT

A wheelchair having a speed and direction control touchpad. The touchpad comprises two separated semi-conductive film layers, one measuring an X coordinate and one measuring a Y coordinate. When pressure is applied to the layers bringing them into contact with each other, an X, Y coordinate location is produced and the wheelchair is moved in a direction and speed analagous to the location of the pressure applied to the touchpad. A change in location of the pressure will result in a corresponding change in direction and speed. The touchpad also has a neutral or no movement activation point.

10 Claims, 4 Drawing Sheets

WHEELCHAIR HAVING SPEED AND DIRECTION CONTROL TOUCHPAD

RELATED APPLICATION

This application is a continuation of application Ser. No. 09/416,647, filed Oct. 12, 1999 now abandoned, the benefit of which is hereby claimed, and which is hereby incorporated by reference.

BACKGROUND OF THE INVENTION

1. Field of the Invention

The present invention relates to a power wheelchair having a touchpad which is used by the person seated therein, e.g. by a single finger or other slight pressure, to control the speed and direction of the wheelchair.

2. Background Art

It is well known that physically handicapped individuals with such disabilities as spinal cord injury, muscular dystrophy, multiple sclerosis, cerebral palsy or arthritis need the assistance of a power wheelchair to be mobile. Heretofore, wheelchairs may be difficult for some users to control if they have severely limited hand and/or finger range and strength.

U.S. Pat. No. 5,778,996 teaches a combination power wheelchair and power walker providing dual controls that may be used by either a seated user or a user walking behind and partially supported by the mobility aid. A hand control assembly provides a seated user with an on-off switch and forward-off-reverse switches for each motor. A direction controller assembly connects and provides coordinated movement of the left and right switch handles of the hand control assembly. The direction controller assembly allows the user to operate both switches with one hand by means of pushing, pulling or twisting motions, and replaces an expensive joystick assembly. A walker control assembly which overrides the hand control assembly, allows a walking user to operate both motors in either a forward or reverse direction, and to easily control walker speed and direction with gentle pushes or pulls on the walker handles. The left and right motors drive rear wheels through a shock absorbing flex coupling that tends to absorb the initial jolt when either motor is turned on.

U.S. Pat. No. 5,542,690 teaches a wheelchair for controlled environments including a pair of tubular sideframes interconnected by a seat and a backrest. Sockets are welded to the sideframes for receiving pins on the underside of the seat. The position of the backrest is adjustable and the backrest is separated from the seat by a gap to avoid trapping contaminants. All metal components of the wheelchair have in integral outer surface. Tacky rollers clean the wheels as the wheelchair rolls and mechanically couple a power unit to the rear wheels. The power unit is controlled from a keyboard attached to a tubular armrest on the wheelchair. Control and signal cables from the keyboard are located within the armrest. A protective garment is provided with the wheelchair to contain contaminants in the clothing of the user and to protect the user.

U.S. Pat. No. 4,493,219 teaches an energy conversion and transmission device is disclosed which, in its preferred embodiment, has a rigid substrate with a resistive area printed on its top surface, a spacer of non-conductive material with an aperture therethrough positioned in register with the rigid substrate resistive area, and a flexible substrate with a resistive area printed on its bottom surface in register with the aperture and the rigid substrate resistive area so that application of a force to the flexible substrate with an elastomeric actuator will move the flexible substrate resistive area to establish an electrical contact area with the rigid substrate resistive area, which electrical contact area increases and, thus, the resistivity of that area decreases as the applied force increases. Thus, when an electrical potential is applied across the two resistive areas, current flow through the two resistive areas increases as the applied force increases. Capacitive, inductive and other embodiments of the device are also disclosed.

U.S. Pat. No. 5,648,708 teaches an apparatus and method that allows a user to exert a force to control a motive machine. The exerted force is transferred by a force transferring means to force sensors which detect the amount and direction in which the force is exerted. The force sensors convert the applied force into an electrical signal, which is used to control the motive features of a machine.

U.S. Pat. No. 4,444,998 teaches a touch controlled membrane device producing an output signal which is a function of any dual coordinate location resulting from an applied pressure in a two dimensional resistive field. In one preferred embodiment, a single resistive film is spaced from a coextensive conductive film. First and second source voltages are alternately applied across orthogonal axis directions of the resistive film to establish voltage gradients in both directions. Pressure applied to the conductive film brings the conductive and resistive films into contact so that a unique two-component output signal appears on the conductive film, which defines the X, and Y coordinates of the location of the applied pressure. In a second embodiment, two resistive films are mounted opposite to two conductive surfaces applied onto opposite sides of an insulative film, and voltage is applied to the resistive films in orthogonally related directions. Pressure applied to one resistive film causes both resistive films to contact the conductive surfaces so that the voltages applied to each conductive surface represent the coordinates of the point of contact.

SUMMARY OF INVENTION

The present invention provides a power wheelchair that offers proportional speed and direction control through a touchpad, which only requires a finger or other slight pressure to operate.

A further aspect of the invention is to provide a touchpad controller, which is easily useable by individuals with severely limited hand and/or finger range and strength. The touchpad allows the user to operate the wheelchair with one finger instead of by pushing, pulling or twisting motions of a joystick or other related assemblies.

Another aspect of the present invention is to provide a touchpad that requires only a light activation force to operate, thus reducing stress on the operator's fingers, hand, wrist and arm.

A still further aspect of the present invention is to offer a touchpad controller, which can be mounted at any angle to suit the driver's needs.

DESCRIPTION OF THE PREFERRED EMBODIMENT

Figure 1:
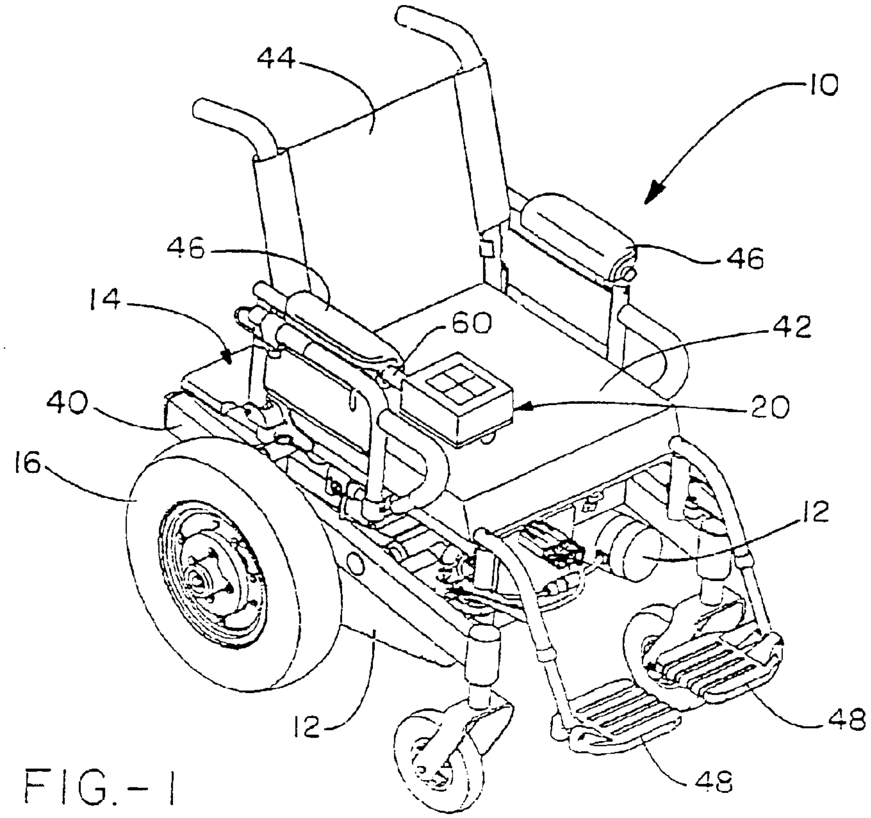
FIG. 1 is a perspective view of an embodiment of a wheelchair having a touchpad.

The wheelchair having a touchpad for controlling speed and direction of the present invention can be any type of conventional, usual or ordinary powered wheelchair. FIG. 1 is an example of a wheelchair 10 which can employ touchpad 20 used in the present invention. The wheelchair can be powered by one or more batteries, D.C. current or any other alternative power source, which is capable of operating the touchpad and chair of the present invention. An optional battery compartment 14 for housing one or more batteries can be seen in FIG. 1, but any other element can be used to locate the batteries on the wheelchair. Any type of motor or motors, generally shown as 12, can be employed to operably drive one or more wheels 16 of the wheelchair. Examples of such motors commonly used in the art can be classified as d.c. gear motors, brushless gear motors, or brushless gearless motors. Different types of wheel drives, for example, front-wheel drive, mid-wheel-drive, rear-wheel drive, all-wheel drive, or four-wheel drive, can also be used in the present invention.

The wheelchair of the present invention generally contains a frame 40 upon which a seat 42 can be mounted. The seat has a seat back 44 and either or both can be stationary or have a fixed position, i.e. non or minimally adjustable. Tilt seats and/or seat backs, which may or may not maintain a constant center of gravity, can also be used. The seat may be a reclining seat or both a tilting and reclining seat. The wheelchair may have arms 46, and footrest 48. Moreover, with regard to power wheelchairs such as that shown in the drawings, different designs and embodiments, such as wheel sizes and locations can be utilized and the drawings are merely an example of one type of wheelchair.

Touchpad 20 of the present invention comprises a touch or pressure controlled device capable of producing output voltage signals, which represent a point of contact along multiple axis directions in a field of two or more dimensions. The touchpad and the signals produced thereby are used to control the speed and direction of the wheelchair. Only a finger, nose, chin, toe, or other suitable object such as a pointer, etc. is needed to make contact or apply pressure to the sensor areas of the touchpad.

Figure 1A:
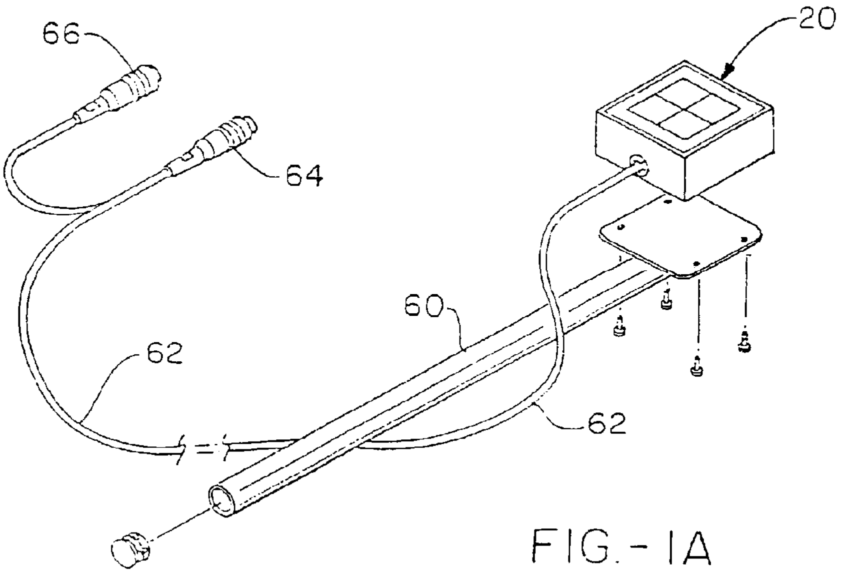
FIG. 1A is a perspective view showing an example of a touchpad mounting assembly.

FIG. 1A shows touchpad 20 being operatively attached to mounting assembly 60. This is only meant to be an example of one method for mounting the touchpad 20 to wheelchair 10. Signal cable 62 is operatively attached to touchpad 20 and is connected to a controller through controller attachment 64. Extra option port 66 can also be attached to signal cable 62. Extra option port 66 is a connection element which can allow touchpad 20 or a controller to be reprogrammed or diagnosed etc.

Figure 2A:
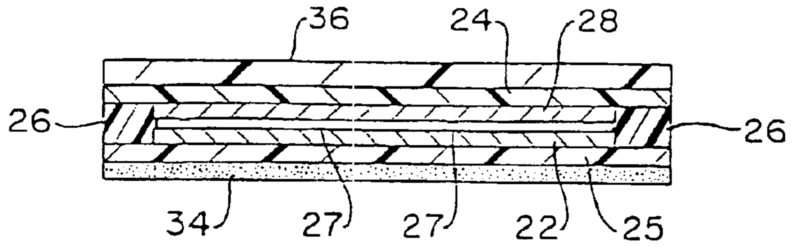
FIG. 2A is a cross-sectional side view of the touchpad assembly showing the various layers contained in the touchpad.
Figure 2B:
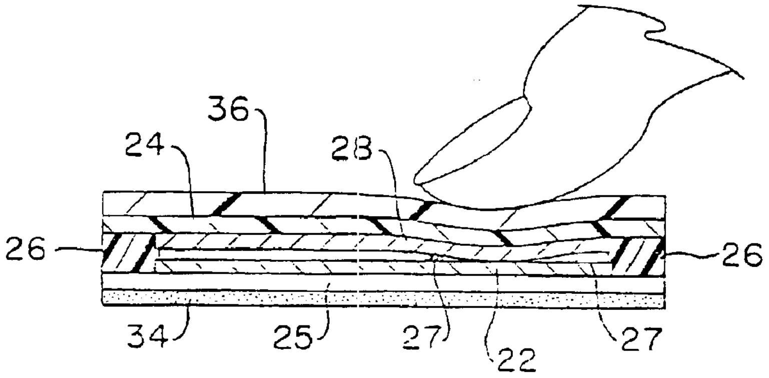
FIG. 2B is the assembly of FIG. 2A showing contact by a finger causing contact between the two semi-conductive layers.
Figure 3A:
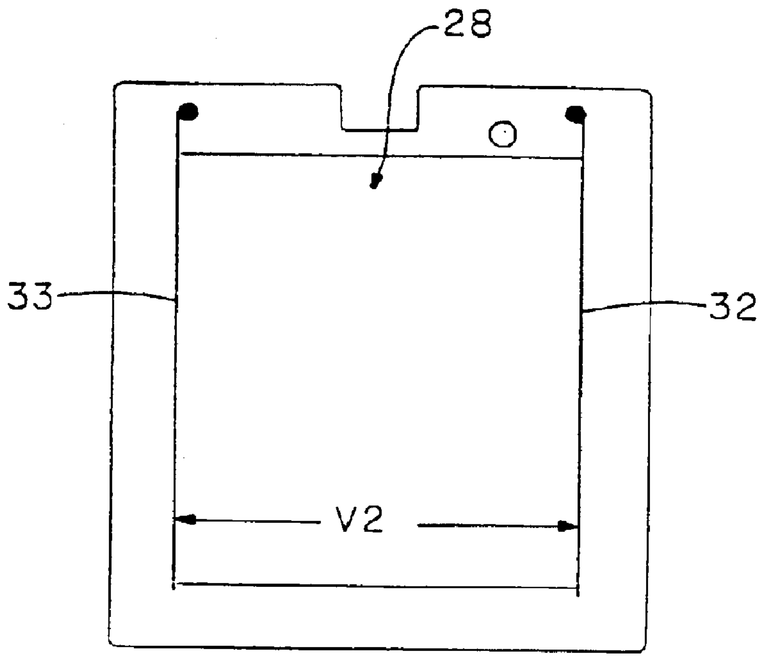
FIG. 3A is a bottom view of the semi-conductive layer which controls the X direction signal of the touchpad.
Figure 3B:
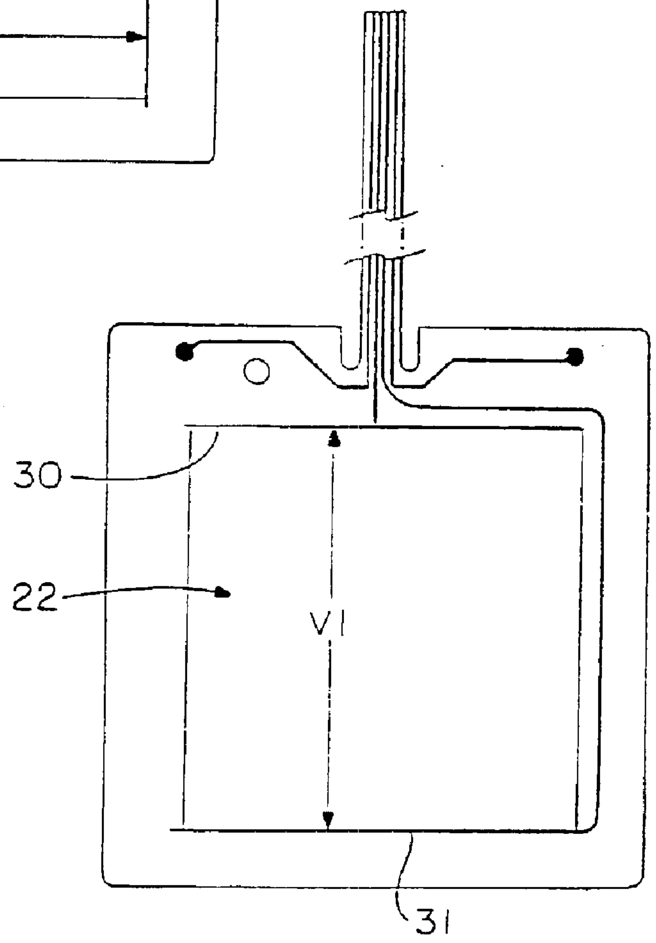
FIG. 3B is a top view of the semi-conductive layer which controls the Y direction signal of the touchpad.

The touchpad assembly comprises a number of layers. A lower semi-conductive layer 22 as shown in FIGS. 2A and 2B comprise a flexible electrically conductive or semi-conductive film or membrane formed in any manner such as from a carbon ink spray, a thin metallic coating, a conductive or semi-conductive plastic, a semi-conductive rubber, or other coating. The lower semi-conductive layer is provided with two electrically lower conductive terminals or bussbars 30 and 31, which are secured along the lengths of opposite film edges as can be seen in FIG. 3B. Upper semi-conductive layer 28 comprises a substantially identical electrically conductive or semi-conductive film or membrane which is also connected along each of two opposing edges to electrically conductive upper terminals or bussbars 32 and 33 as shown in FIG. 3A. Upper layer 28 is positioned on lower layer 22 so that lower terminals 30 and 31 are orthogonally oriented to upper terminals 32 and 33 of upper layer 28 when the faces of both films are positioned parallel to and coextensive with each other. The orthogonally oriented films together define a two dimensional resistive field wherein electrical resistivity varies with distance from the bussbars or the elongated terminals.

A spacer layer 26 as seen in FIG. 2A is interposed around and/or between lower layer 22 and upper layer 28 generally about the perimeter thereof to prevent the lower and upper layers from contacting each other until a predetermined pressure is applied to the surface of the touchpad. Within the opening or perimeter of spacer layer 26, exists spacer balls, spheres, dielectric dots 27, or other non-active or nonconductive elements which serve to keep upper and lower semiconductive areas separated. A key aspect concerning the use of spacer balls, spheres, etc. is that they keep the two semi-conductive layers separated but yet are sufficiently distanced from one another so that upon applying pressure to the touchpad, semi-conductive sheets 22 and 28 are able to contact one another and thus complete an electrical circuit. The actuation force needed to contact upper and lower layers is generally of from about 0.25 to about 1.00 ounce. The average human finger weighs about 0.75 ounces, easily allowing for finger operation of the touchpad.

In operation, a first voltage V1 is applied across lower semiconductive layer or resistive film 22 between terminals 30 and 31, and a second voltage V2 is applied across upper semi-conductive upper layer or resistive film 28 between terminals 32 and 33. The direction of current flow, and hence the direction of the voltage gradient in film 22, is substantially orthogonally oriented with respect to the currently flow and voltage gradient in film 28. Therefore, if sufficient pressure is applied to cause semi-conductive layers 22 and 28 to contact each other, then voltages which correspond to the X and Y coordinates of the contact location will be transmitted to those semi-conductive surfaces. Thus, for example, if voltage V1 applied between terminals 30 and 31 across film 22 is defined as the Y dimension, and the voltage V2 applied between terminals 32 and 33 across film 28 is defined as the X dimension, then the voltage measured at the point of contact between the films represent the Y coordinate as well as an X coordinate. The applied voltages V1 and V2 may be either a.c. or d.c.; they can be simultaneously, sequentially or separately applied; and they may have the same or different waveforms since the output voltage for each coordinate is derived from a totally separate conductive surface. While not shown, both the X and Y axes can be separated in the touchpad, each axis having two semi-conductive layers, giving a total of four semiconductive layers for the touchpad. Additional semi-conductive layers can also exist if desired.

The touchpad elements are operatively connected to the power source of the wheelchair and drive means in order that the touchpad controls the speed and direction thereof.

Figure 4:
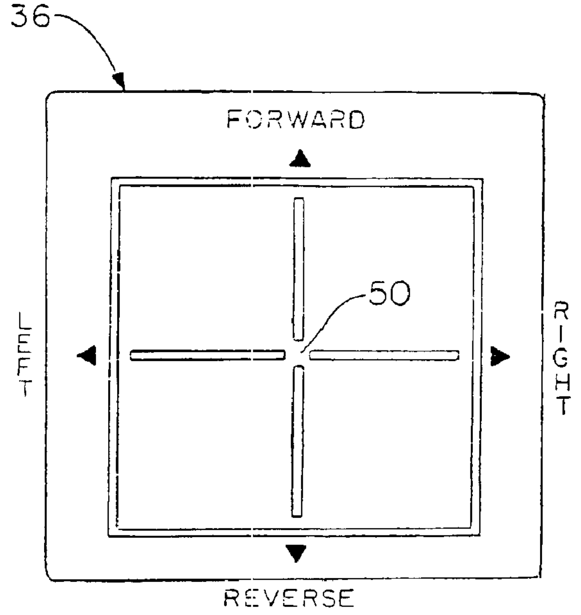
FIG. 4 is a top view of a graphic overlay containing markings to aid the user operating the chair.

The touchpad is contained in an enclosure or housing, preferably rigid aluminum, which provides access to the active area of the touchpad surface but also protects the rest of the assembly. Desirably, lower semi-conductive layer 22 and upper semi-conductive layer 28 reside upon a flexible substrate 25 and 24 respectively which can be any suitable plastic or other non-conductive layer. Positioned over the assembly comprising non-conductive layers 24 and 25 and semiconductive layers 22 and 28 is generally a protective overlay-36 which protects the touchpad circuitry and seals out dust and water. The protective overlay can contain a graphic overlay or template, which contains various markings or nomenclature, which serve to aid the person using the chair. One example of a graphic overlay is shown in FIG. 4. Substrate 34 can be a plastic, non-conductive adhesive or other layer, which is attached to the touchpad housing. The touchpad assembly is generally square in shape and about 3.25 inches by 3.25 inches, but it can be any size or shape to meet the above noted objectives. The touchpad is preferably mounted on the housing so that it is in a horizontal position but it can be located in any position and/or it can be contoured to suit various needs of certain users.

The following is an example of how the touchpad controls the wheelchair speed and direction. The touchpad assembly 20 is operatively mounted on an arm 46 of the wheelchair, or at any other suitable location where it can comfortably be operated by the user of the chair. To activate the touchpad, the user places a finger on the zero, neutral, or starting point of the touchpad as shown by 50 in FIG. 4. The graphic overlay on the touchpad generally comprises an X, Y grid and the neutral point is located at the intersection of the X and Y axes, commonly the center of the pad. When the user's finger 52 or other slight pressure is applied to the touchpad, the film flexes and a circuit is formed when lower semi-conductive layer 22 and upper semiconductive layer 28 contact one another. An example is shown in FIG. 3B.

The touchpad of the present invention is a proportional speed and direction-controlling device. In other words, the further one's finger is from the neutral point, the electrical resistivity is less with regard to that region and thus corresponds to a proportionally larger electrical voltage signal which is sent to the motor with regard to speed and direction. Thus, when a user moves their finger slidably along the touchpad, the wheelchair responds and moves in a direction analogous to the finger movement on the touchpad and at a speed which corresponds to a distance from the neutral point of the touchpad. This is because the contact between the layers completes a circuit giving both X and Y coordinates which correspond proportionally to the direction and proportionally to the speed of the wheelchair. For example, if the user moves their finger forward in a positive Y direction, the chair moves forward and at a speed proportionally or corresponding to the distance from the neutral point. If the user moves their finger in a positive X and Y direction, the chair moves forward at a given speed and to the right. The circuit is broken when pressure, i.e. usually the finger of the user, is removed and the film or membrane returns to its normally open or separated position. Alternatively, other grids can also be utilized such as one obtained by rotating the XY axis 45°.

Alternatively, the touchpad can be programmed so that one does not have to start at a neutral point to activate the chair, where any contact creating a circuit on the touchpad can be used to activate the chair.

Conventionally, the wheelchair has two motors, each motor driving a separate wheel. As explained in greater detail hereinbelow, a controller and operative circuitry will divide the signal to drive the wheels at a faster rate the greater the pressure contact point is from the neutral point and also instruct one wheel to turn at a faster speed in order to change direction.

In a preferred embodiment of the present invention, if the user's finger or other pressure contacting element is lifted from the pad for more than a predetermined length of time, the user must reactivate the touchpad and wheelchair by starting from the neutral point. The amount of time from when contact is last made with the touchpad and when the touchpad must be reactivated from neutral is generally from about 0 or 1 milliseconds to about 1 second, desirably from about 100 to about 800 milliseconds, and preferably from about 200 to about 300 milliseconds.

One advantage of the touchpad control is that it provides the driver with tactile feedback, because the pad must be touched with direct contact in order to drive the chair.

Figure 5:
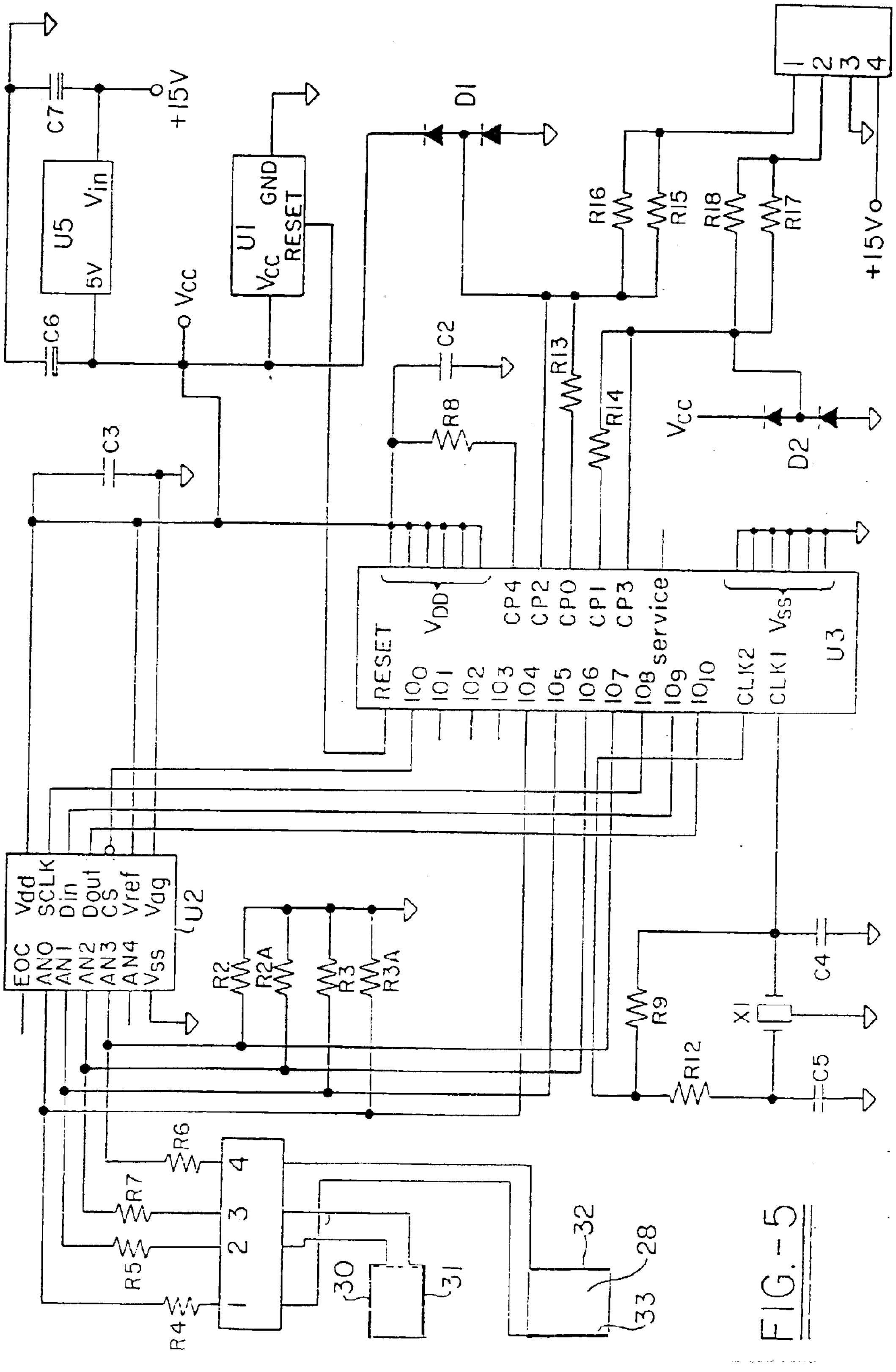
FIG. 5 is an electrical touchpad interface schematic.

One particular electrical configuration for controlling and operating the touchpad assembly can be seen in FIG. 5. The electronics of the touchpad are based on a micro controller that performs A/D conversions on the resistive touchpad and communicates thereto via a twisted pair network.

The parts description of the touchpad interface electronics circuit, which can generally be seen in FIG. 5 is as follows: U5 regulates the 15 VDC from the controller's power supply down to 5 VDC for use on the Touch Pad Interface Electronics PCB. Capacitors C2, C3, C6 and C7 are used for filtering. U3 is the microcontroller integrated circuit (IC), for example a Motorola MC 143120 microcontroller. It is used for control of the A/D converter (U2) driving the touchpad assembly 20, as well as communications to the main controller via twisted pair network. C4, C5, X1, R12 and R9 comprise the oscillator circuit for the microcontroller clock. D1, D2, R8, R13–R18 are provided for proper direct connection to serially communicate with the wheelchair motor control electronics. U1 is the reset circuit for the microcontroller IC (U3). It resets the microcontroller 150 ms after the 5 VDC power supply has been established. U2 is the A/D converter used for reading the voltage levels from the touch pad. Even though AN0, AN1, AN2 and AN3 are all connected to the touchpad assembly 20, only AN0 and AN1 are used for measurements. The A/D converter (U2) is controller by the microcontroller IC (U3) using the SPI bus common to both the microcontroller IC and the A/D converter IC. R4–R6 are voltage divider resistors preventing the output from the touch pad, when activated, from going to either 0 VDC or 5 VDC. R2–R3A are pull down resistors used to pull the outputs of the touch pad to 0 VDC when it is deactivated.

All of the measurements and multiplexing of the signals is generally done through appropriate firmware. Upon power up, U3 is reset causing the firmware to run a reset routine. This reset routine initializes several variables and also reads AN0 and AN1. AN0 is the speed reading and AN1 is the direction reading. This reading is necessary since the first readings from the A/D converter are not valid and must be thrown away.

When the main controller requests speed and direction information from the touchpad, about every 10 ms, the last speed and direction readings are sent out over the neuron network (twisted pair) and the next readings are taken. The Speed reading is performed by the following sequence. IO5 and IO6 on U3 are configured as outputs and IO4 and IO7 are configured as inputs (high impedance). Set IO5 to high, 5 VDC and IO6 as low, 0 VDC. The A/D conversion is then performed on AN0. If the touchpad is not pressed, there is no connection between the layers and AN0 is essentially floating if not for R3A. R3A pulls the signal to 0 VDC. The A/D reading is then 0. If the touchpad is activated, then there is a connection between the layers and the voltage corresponding to the speed is seen at AN0. 2.5 VDC is mid scale i.e. neutral for speed. The voltage cannot go to either 5 VDC or 0 VDC due to the resister divider effects of R5 and R7. The Direction reading is performed in much the same way. IO7 and IO4 on U3 are configured as outputs and IO5 and IO6 are configured as inputs (high impedance). Set IO7 to high, 5 VDC and IO4 as low, 0 VDC. The A/D conversion is then performed on AN1. If the touchpad is not pressed, there is no connection between the layers and AN1 is essentially floating if not for R3. R3 pulls the signal to 0 VDC. The A/D reading is then 0. If the touchpad is activated, then there is a connection between the layers and the voltage corresponding to the direction is seen at AN1. 2.5 VDC is mid scale i.e. neutral for direction. The voltage cannot go to either 5 VDC or 0 VDC due to the resister divider effects of R4 and R6.

If the speed or direction are zero for more than 250 ms, then a start from neutral flag is set and then the user must start from neutral i.e. 2.5 VDC for both direction and speed. This will then re-enable the touchpad for driving.

The preferred controller of the present invention is the MKIV controller available from Invacare Corporation of Cleveland, Ohio, but any other suitable controller known in the art may be utilized.

While in accordance with the patent statutes the best mode and preferred embodiment have been set forth, the scope of the invention is not limited thereto, but rather by the scope of the attached claims.

What is claimed is:

1. A wheelchair comprising:

a frame supporting a drive wheel;

at least one motor supported on said frame for driving said drive wheel;

a controller operatively connected with said motor; and a programmable touchpad supported on said frame and operatively connected with said controller, said touchpad having adjacent first and second semi-conductive layers and having an output that is indicative of desired speed and direction of movement of said wheelchair;

said touchpad having a first programmable state in which said motor can be activated only after contact of said semi-conductive layers at a neutral point;

said touchpad having a second programmable state in which said motor can be activated without initial contact of said semi-conductive layers at a neutral point.

2. A wheelchair as set forth in claim 1 wherein said touchpad has a third programmable state upon absence of pressure contact for a period of time greater than a predetermined period of time, in which said motor can be activated only after contact of said semi-conductive layers at a neutral point.

3. A wheelchair as set forth in claim 1 wherein said touchpad has a third programmable state upon absence of pressure contact for a period of time greater than a predetermined period of time, in which said motor can be activated only after contact of said semi-conductive layers at a neutral point.

4. A wheelchair as set forth in claim 3 wherein said predetermined period of time is in the range of up to one second.

5. A wheelchair comprising:

a frame supporting a drive wheel;

at least one motor supported on said frame for driving said drive wheel;

a controller operatively connected with said motor; and a programmable touchpad supported on said frame and operatively connected with said controller, said touchpad having an output that is indicative of desired speed and direction of movement of said wheelchair;

said touchpad having a central area for controller activation and a surrounding area for wheelchair speed and direction control;

wherein said touchpad has a programmable state in which, after absence of pressure contact on said touchpad for a period of time greater than a predetermined period of time, said motor can be activated only by contact in said central area.

6. A wheelchair as set forth in claim 5 wherein said predetermined period of time is in the range of up to one second.

7. A wheelchair comprising:

a frame supporting a drive wheel;

at least one motor supported on said frame for driving said drive wheel;

a controller operatively connected with said motor; and a programmable touchpad supported on said frame and operatively connected with said controller, said touchpad having an output that is indicative of desired speed and direction of movement of said wheelchair;

said touchpad having a central area for controller activation and a surrounding area for wheelchair speed and direction control;

wherein said touchpad has a programmable state in which, after absence of pressure contact on said touchpad for a period of time greater than a predetermined period of time, a user must reactivate the touch pad and wheelchair.

8. A wheelchair as set forth in claim 7 wherein reactivation of the touchpad occurs by contact with said touchpad.

9. A wheelchair as set forth in claim 8 wherein reactivation of the touchpad occurs by contact in said central area of said touchpad.

10. A wheelchair as set forth in claim 7 wherein said predetermined period of time is in the range of up to one second.

* * * * *